Dec. 19, 1944. C. S. ASH 2,365,618
DUAL WHEEL ASSEMBLY
Filed June 30, 1943
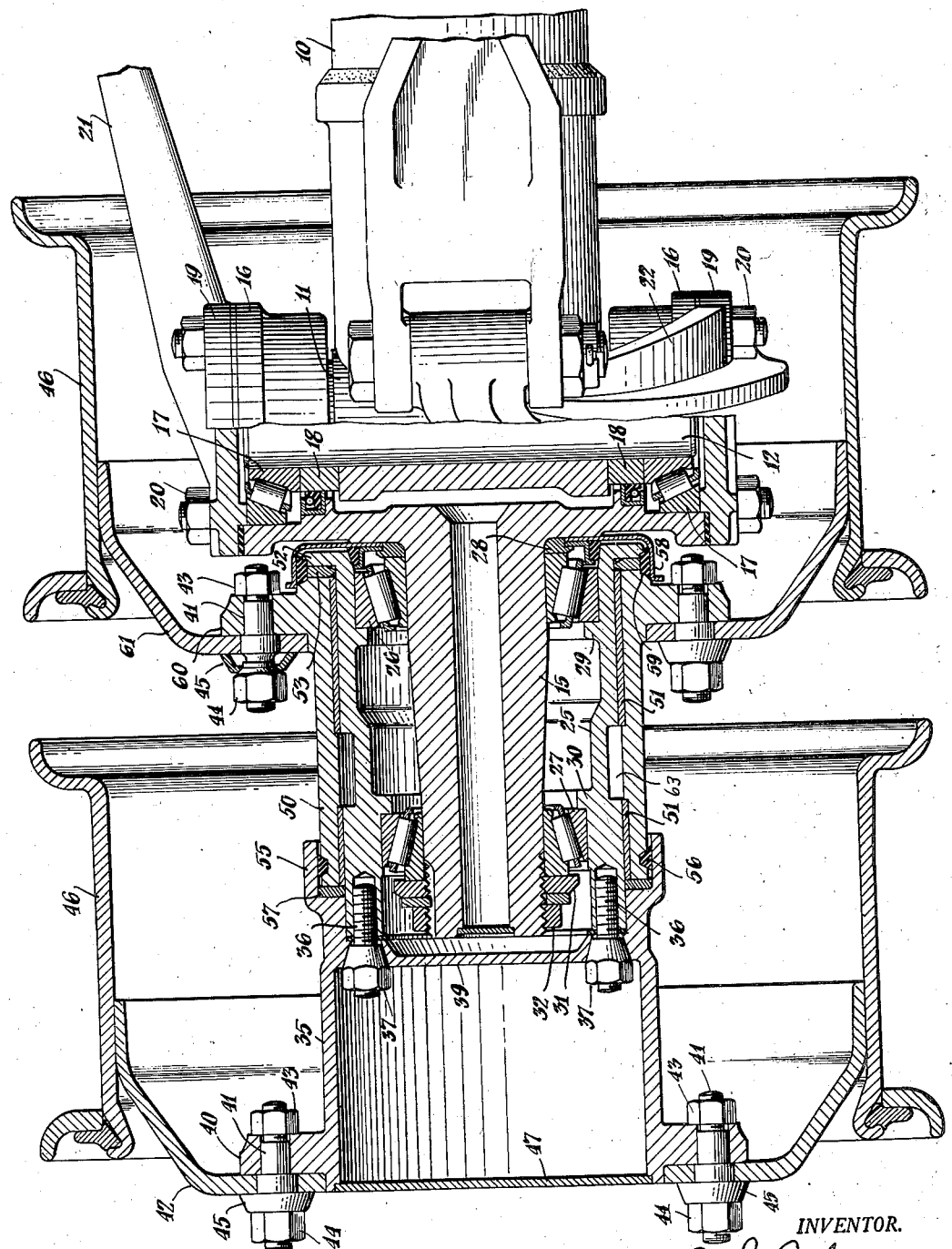
INVENTOR.
C. S. Ash
BY
Hobart N. Durham
ATTORNEY Patented Dec. 19, 1944

2,365,618

UNITED STATES PATENT OFFICE 2,365,618

DUAL WHEEL ASSEMBLY

Charles S. Ash, Milford, Mich.

Application June 30, 1943, Serial No. 492,836

9 Claims. (Cl. 301—36)

The present invention relates to dual wheel assemblies in which the individual wheels of the assembly are independently relatively rotatable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

It is an object of the present invention to provide an improved dual wheel assembly for vehicles in which the individual wheels of the assembly are independently relatively rotatable. A further object is the provision of such a dual wheel assembly which will afford greater flotation and maneuverability for a vehicle in mud, sand or other soft footing. Still another object is the provision of an independently rotatable dual wheel assembly mounted on a relatively short axle or spindle member but still affording the proper wheel spacing of inwardly dished web type wheels. The invention further provides an easily assembled and disassembled differential dual wheel assembly and one having smaller members which are more easily manufactured.

The drawing is a side view partly in cross section and partly in elevation of a typical and illustrative embodiment of the present invention for use at the front or steering end of a vehicle.

Referring now in detail to the illustrative embodiment of the invention shown by way of example in the drawing, there is provided a tubular front or steering axle 10 of a vehicle at either end of which is secured a steering knuckle 11 with a king pin 12 held thereby. A relatively short spindle 15 is mounted for dirigible movement about the end of axle 10, the spindle having upper and lower yoke arms 16 mounted on the knuckle 11 and about king pin 12 by means of anti-friction bearings 17 and relatively thick washer members 18. Upper and lower cap members 19 secured to the yoke arms 16 by means of nuts 20, and a steering arm 21 and tie rod arm 22 secured to the upper and lower cap members respectively complete the dirigible spindle assembly of the embodiment of the invention shown.

An inner hub member 25 is mounted for free rotation upon the spindle 15 by means of an inner anti-friction bearing 26 and an outer anti-friction bearing 27. The inner bearing 26 seats inwardly against a substantial washer member 28 and outwardly against an inwardly extending annular shoulder 29 of the hub 25. The outer bearing 27 seats inwardly against an inwardly extending annular shoulder 30 of the hub 25, and the assembly is maintained in position by nuts 31 and 32 threaded on the end of the spindle 15.

A substantially cylindrical hub extension member 35 is secured to the outer end of the inner hub 25 by means of bolts 36 threaded into the end of the hub and cooperating nuts 37. The nuts 37 are of frusto conical shape to engage cooperatingly formed surfaces about circular apertures in a web 39 which is an integral part of the extension member 35. The web 39 thus serves to seal off the end of the spindle and bearing assembly from entrance of dust and moisture and loss of lubricant, and to provide a firm anchoring member for securing the hub extension to the inner hub 25.

At its outer end the extension member 35 is provided with a plurality of outwardly radially extending spoke portions 40 having apertures to receive wheel mounting bolts 41. An outer wheel web 42 is mounted and secured on the spokes 40 and bolts 41 by means of nuts 43, 44 and spacing cap 45, and the wheel web is positioned in inwardly dished relation to the wheel assembly. A rim member 46 is provided on the wheel web for mounting a pneumatic vehicle tire. A circular cover plate 47 may be provided over the outer end of extension member 35 to prevent accumulation therein of dirt and mud.

An outer cylindrical hub member 50 is provided for the inner wheel of the dual wheel assembly. The hub 50 is journalled in telescopic relationship upon the inner hub 25 and inter-hub bushings 51 are interposed to insure free independent rotation of the hubs. The inter-hub bushing 51 inwardly of the assembly is wider than the outer bushing, because the load carried is greater, the inner wheel of the assembly being mounted substantially centrally of the inner bushing and being inwardly dished. The inner end of outer hub 50 is positioned by an outwardly radially extending integral annular shoulder 52 on the inner end of hub 25, and a thrust bearing 53 is positioned between the shoulder 52 and the end of the outer hub 50.

The outer end of hub 50 is maintained in position against the inner end of the extension member 35, said extension and the outer hub being in substantially cylindrical alignment. A cylindrical inwardly extending portion 55 of extension 35 overlaps the outer end of hub 50, and a packing ring 56 is interposed to seal the bearing and hub assembly at this place. An annular thrust bearing 57 is interposed between the ends of extension 35 and hub 50 to take the outward thrust of the hub.

The hub and bearing assembly is further protected and sealed by the provision of an annular plate 58 at the inner end of the assembly, which is outwardly cylindrically turned to maintain a packing ring 59 over the inner thrust bearing 53.

The inner hub 25 is provided with an external groove or cavity 63 about its central portion in order to provide a lubricant storage space between the wheel hubs 25, 50 and between the inter-hub bushings 51.

A plurality of outwardly radially extending spoke members 60 are provided at the inner end of the outer hub 50 and integral therewith. An inner wheel web 61 is mounted on spokes 60 by means of mounting bolts 41, nuts 43 and 44 and spacing members 45 identical with those for the outer wheel web 42. The inner wheel web 61 is mounted in inwardly dished relationship similarly to the outer wheel web, and is likewise provided with a pneumatic tire mounting rim 46.

With the independently rotatable dual wheel assembly shown and described it is apparent that a relatively short spindle 15 has been utilized to mount the wheel webs 42 and 61, and that the rims and tires may have a proper spacing by means of the telescoped arrangement of the hubs 25 and 50 and the use of a hub extension member 35 for the inner hub. It is further apparent that the wheel webs may be mounted on the spindle 15 in inwardly dished relation which is desirable for maintaining flotation of the assembly in soft footing and preventing accumulation of mud, sand and dirt in the dished portion of the outer wheel. The wheel assembly may be conveniently assembled and disassembled and the separable inner hub and extension construction for rotatably mounting the outer wheel web promotes this as well as providing smaller parts to be manufactured and handled.

The groove 63 is filled with lubricant at the same time the bearings 26 and 27 are packed with lubricant. It will be noted that lubricant in groove 63 will be thrown outwardly by centrifugal action when the wheel assembly is in operation and the hubs are rotating. The lubricant is thus forced outwardly and into the inter-hub bushings 51, providing adequate and automatic lubrication of the telescoped hub construction.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly comprising, in combination, a rotatably mounted hub member, a second hub member journalled on the first hub member for independent relative rotation, a hub extension removably secured to the first hub at the outer end thereof, and a pair of inwardly dished wheels one mounted on the outer end of the extension and the other mounted on the inner end of the second hub member.

2. A dual wheel assembly comprising, in combination, a rotatably mounted hub member, a second hub member journalled on the exterior of the first hub member for independent relative rotation, an axially outwardly extending substantially cylindrical hub extension removably secured to the outer end of the first hub, and a pair of wheels one mounted on the outer end of the extension and the other mounted on the inner end of the second hub member.

3. A dual wheel assembly comprising, in combination, a rotatably mounted hub member, an outwardly radially extending shoulder on the inner end of said hub member, a substantially cylindrical outwardly axially extending hub extension removably secured to the outer end of the hub member, said extension having a greater outer diameter than said hub member, a second hub member journalled on the exterior of the first hub member between the inner end of the extension and the shoulder, and inwardly dished wheels mounted on the outer end of the extension and the inner end of the second hub.

4. A dual wheel assembly comprising, in combination, a rotatably mounted hub member, an outwardly radially extending shoulder on the inner end of said hub member, a substantially cylindrical outwardly axially extending hub extension removably secured to the outer end of the hub member, said extension having a greater outer diameter than said hub member, a second hub member journalled on the exterior of the first hub member between the inner end of the extension and the shoulder, thrust bearings between the ends of the second hub member and the inner end of the extension and the shoulder, and inwardly dished wheels mounted on the outer end of the extension and the inner end of the second hub.

5. A dual wheel assembly comprising, in combination, a spindle, a hub member rotatably mounted on the spindle by anti-friction bearings, a substantially cylindrical hub extension having an integral diaphragm member adjacent the inner end, means removably securing the diaphragm member to the outer end of the hub whereby the diaphragm member closes off the outer end of the hub member, a second hub member journalled on the exterior of the first hub member in telescoped relationship for independent relative rotation, and a pair of wheels one secured to the outer end of the extension and the other secured to the inner end of the second hub member.

6. Hubs for an independently rotatable dual wheel assembly comprising, in combination, a rotatably mounted hub member, a substantially cylindrical hub extension member removably secured to the outer end of said hub member, a second hub member journalled on the exterior of the first hub member for independent relative rotation, and means at the outer end of the extension member and the inner end of the second hub member for mounting wheels thereon.

7. Hubs for an independently rotatable dual wheel assembly comprising, in combination, a rotatably mounted hub member, a substantially cylindrical hub extension member removably secured to the outer end of said hub member, a second hub member in substantially cylindrical alignment with said extension member journalled on the exterior of the first hub member for independent relative rotation, and means at the outer end of the extension member and the inner end of the second hub member for mounting wheels thereon.

8. A dual wheel assembly comprising, in combination, a spindle, a hub member rotatably mounted on the spindle said spindle being substantially wholly enclosed in said hub member, a substantially cylindrical hub extension removably secured to the outer end of the hub member, a second hub journalled on the exterior of the first hub member for independent relative rotation, and wheels mounted at the outer end of the extension and the inner end of the second hub member.

9. Hubs for an independently rotatable dual wheel assembly comprising, in combination, a rotatably mounted hub member, a substantially cylindrical hub extension member removably secured to the outer end of said hub member, a second hub member journalled on the exterior of the first hub member for independent relative rotation, a substantially cylindrical bushing member between the hub members adjacent the outer ends thereof, a wider substantially cylindrical bushing member between the hubs adjacent the inner ends thereof, means at the outer end of the extension member for mounting a wheel thereon, and means at the inner end of the second hub member for mounting a wheel thereon to position said wheel substantially centrally of the length of said wider bushing member.

CHARLES S. ASH.